United States Patent [19]
Bae

[11] Patent Number: 5,774,707
[45] Date of Patent: Jun. 30, 1998

[54] CONTROL DEVICE AND METHOD FOR VARIABLY CONTROLLING AN OPERATION TIME OF AN OPERATION APPARATUS

[75] Inventor: Jong Kon Bae, Seoul, Rep. of Korea

[73] Assignee: LG Semicon Co., Ltd, Cheongju, Rep. of Korea

[21] Appl. No.: 730,900

[22] Filed: Oct. 18, 1996

[30] Foreign Application Priority Data

Oct. 19, 1995 [KR] Rep. of Korea .................. 36170/1995

[51] Int. Cl.⁶ ........................................................ G06F 1/04
[52] U.S. Cl. ................................................................ 395/559
[58] Field of Search ............................................... 395/559

[56] References Cited

U.S. PATENT DOCUMENTS 4,339,808   7/1982   North .................................. 395/732

*Primary Examiner*—Thomas M. Heckler
*Attorney, Agent, or Firm*—Fleshner & Kim

[57] ABSTRACT

An operation apparatus and an operation control method thereof which detect logic transitions by each bit of an input signal, and, by variably adjusting an operation time in accordance with the number of detected logic transitions, reduces an average operation time, and improves an operation function, wherein an average operation time is reduced since the operation time is varied in accordance with the number of input bit logic transitions, which improves an operation efficiency of a computer system.

16 Claims, 5 Drawing Sheets

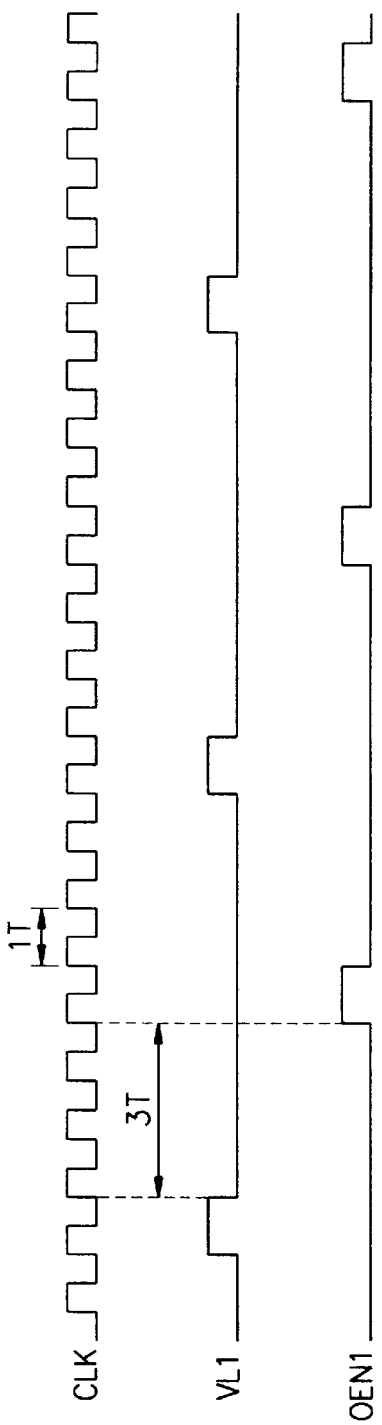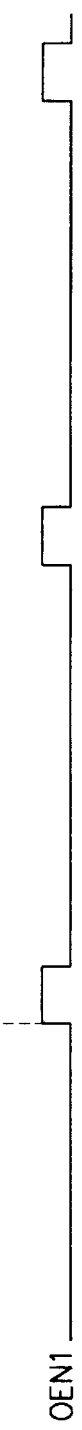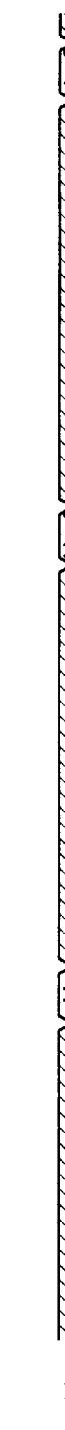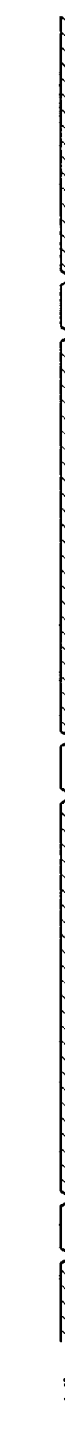
FIG. 2A CONVENTIONAL ART
FIG. 2B CONVENTIONAL ART
FIG. 2C CONVENTIONAL ART
FIG. 2D CONVENTIONAL ART
FIG. 2E CONVENTIONAL ART
FIG. 2F CONVENTIONAL ART
FIG. 2G CONVENTIONAL ART

| TRANSITED INPUT BITS | Vp0 | Vp1 | Vp2 | Vp3 |
|---|---|---|---|---|
| 4 | 1 | 1 | 1 | 1 |
|  | 1 | 1 | 1 | 0 |
|  | 1 | 1 | 0 | 1 |
| 3 | 1 | 0 | 1 | 1 |
|  | 0 | 1 | 1 | 1 |

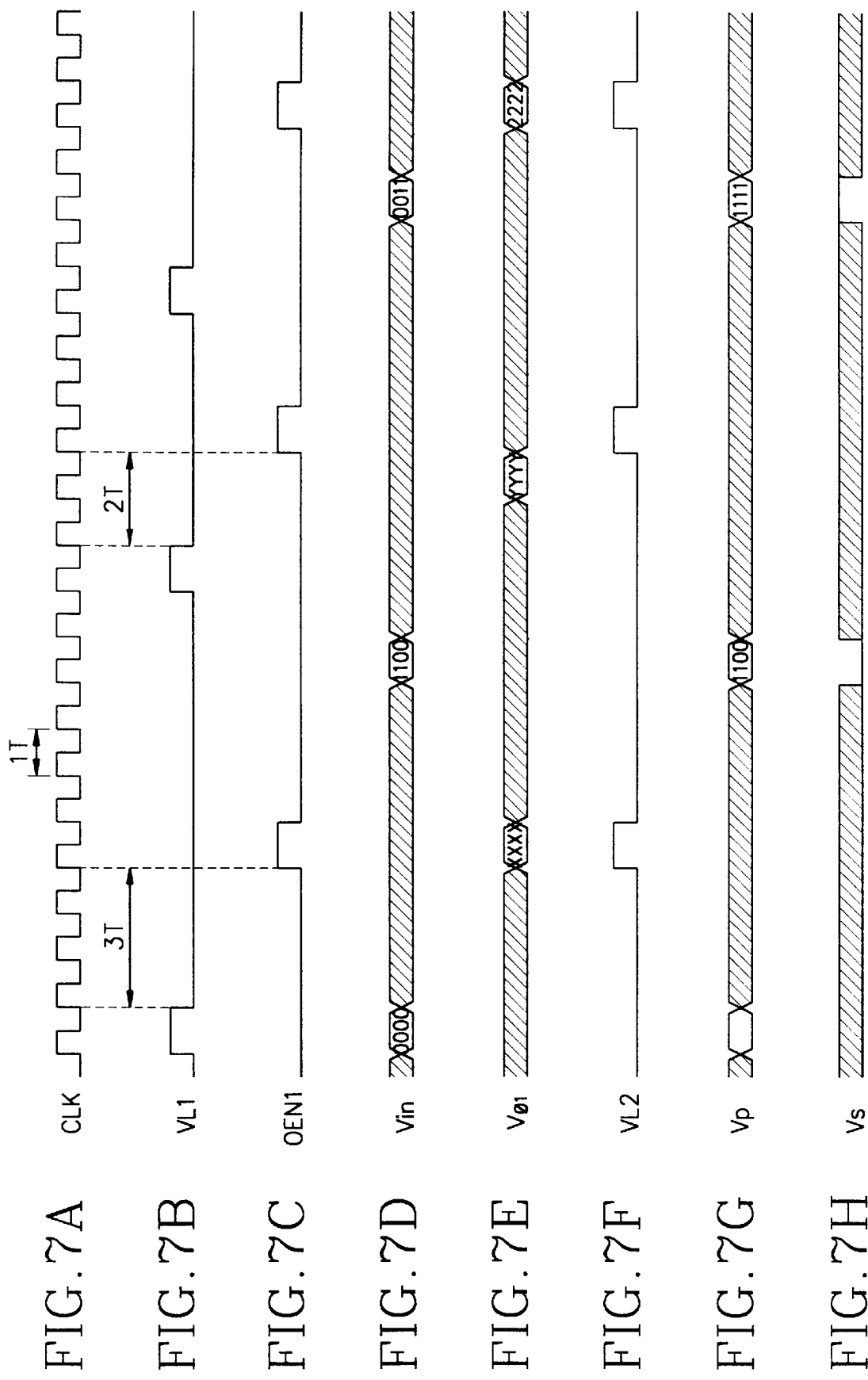

CONTROL DEVICE AND METHOD FOR VARIABLY CONTROLLING AN OPERATION TIME OF AN OPERATION APPARATUS

BACKGROUND OF THE INVENTION

1. Field of the Invention

The present invention relates to an operation apparatus for a computer processor and an operation control method thereof, and in particular, to an operation apparatus and an operation control method thereof which are capable of varying an operation time in accordance with the number of logic transitions by detecting the logic transitions by bits of an input signal to the operation apparatus.

2. Description of the Conventional Art

Conventionally, an operation device is used for a central processing unit (CPU) of a digital computer performing arithmetic operations such as an addition, substraction, multiplication, and division. In an operation apparatus, it is very important to reduce the operation time in order to perform a high speed operation. To achieve the above-mentioned high speed operation, it is necessary to operate a plurality of operation apparatuses in parallel, or perform operations by a pipeline control method.

FIG. 1 shows a conventional operation apparatus. As shown therein, the conventional operation apparatus includes a first operation unit 10 for receiving an input signal $V_{in}$ and performing an operation thereon, a second operation unit 20 for receiving an output signal $V_{O1}$ of the first operation unit 10 and performing a second operation thereon, and a controller 30 for receiving a control signal CTL and a clock signal CLK, outputting a first latch signal VL1, a first output enable signal OEN1 to the first operation unit 10 and outputting a second latch signal VL2, and a second output enable signal OEN2 to the second operation unit 20 for thereby controlling an operation function of the first and the second operation units 10 and 20.

A conventional operation of an operation apparatus will be described with reference to FIGS. 2A through 2G.

First, when an input signal $V_{in}$ is inputted to a first operation device 10, a controller 30 is enabled in accordance with the control signal CTL and counts the clock signal CLK, and generates first and a second latch signals VL1 and VL2, and first and second output enable signals OEN1 and OEN2. When the first latch signal VL1 is inputted to the first operation unit 10, the first operation unit 10 latches and operates upon input signal $V_{in}$. Next, the first operation unit 20 outputs the operated output signal $V_{O1}$ to the second operation unit 20 in accordance with the first output enable signal OEN1 from the controller 30. In the same manner, when the second latch signal VL2 is inputted to the second operation unit 20, the second operation unit 20 latches and operates upon output signal $V_{O1}$ outputted from the first operation unit 10, and outputs an operated output signal $V_{O2}$ in accordance with the second output enable signal OEN2 from the control unit 30.

Here, the clock signal CLK is referred to a signal with which the controller 30 controls the timing of the first and the second latch signals VL1 and VL2 and the first and second output enable signals OEN1 and OEN2.

The above-mentioned conventional operation of an operation apparatus will be described in detail below with reference to the timing drawings of FIGS. 2A through 2G.

The controller 30, when enabled in accordance with the control signal CTL, counts the clock signal CLK, as shown in FIG. 2A, and outputs first and second latch signals VL1, VL2, as shown in FIGS. 2B and 2F and a first output enable signal FIG. 2C to the first and second operation units 10 and 20, respectively. As illustrated in FIGS. 2C and 2F, the first output enable signal OEN1 and the second latch signal VL2 are enabled at the same time. In addition, the input signal Vin is inputted at the same time when the first latch signal VL1 is enabled, as shown in FIG. 2D.

In the first operation unit 10, the input signal Vin latched in accordance with the first latch signal VL1 is operated upon, and the operated output signal V01 is inputted to the second operation unit 20 in accordance with the first output enable signal OEN1 of FIG. 2C. In the same manner, in the second operation unit 20, the output signal $V_{o1}$ of the first operation unit 10 latched in accordance with the second latch signal VL2 is operated upon, and the operated output signal $V_{o2}$ is outputted in accordance with the second output enable signal OEN2. FIG. 2G shows an input signal Vin having a predetermined data value.

When one cycle of the clock signal CLK is 1T in an operation of the first operation unit 10, the time of 3T elapses from the moment the input signal Vin is latched in accordance with the first latch signal to the moment the operated output signal $V_{01}$ is outputted in accordance with the first output enable signal OEN1. Here, "3T" is time required when the first operation unit 10 performs an operation function and is determined by the input signals to the controller 30, that is by the control signal CTL and the clock signal CLK.

The time required is proportional to the number of logic transitions based on the bits of the input signal Vin when the input signal Vin is inputted to the first operation unit 10 by n bits (for example, 4 bits), and the first operation unit 10 operates upon the n bits of the input signal Vin. For example, as shown in FIG. 2G, when the input signal Vin changes from the form of "0000" to the form of "1111", the number of logic transitions by bits is four (4), and when the input signal Vin changes from the form of "1111" to the form of "1011", the number of logic transitions based on the bits of the input signal Vin is one (1). Here, a logic transition by bit means that each bit changes from a low logic level to a high logic level or from a high logic level to a low logic level.

As described above, although the time required for the first operation unit 10 to operate upon the input signal Vin is proportional to the number of bit logic transitions, in the conventional art, an operation time of the first operation unit 10 is fixed as "3T", irrespective of the number of bit logic transitions. An example of this is shown in Table 1;

TABLE 1

| number of input bit transition | actual operation time | conventional operation time |
| --- | --- | --- |
| 0, 1, 2 | 2T | 3T |
| 3, 4 | 3T | 3T |

As shown in Table 1, when the number of logic transitions by bits of the input signal is zero, one, or two (0,1,2), the operation time is "2T", but the operation time controlled by the first latch signal VL1 and the first output enable signal OEN1 is "3T". The reason that the operation time is fixed at "3T" is that an operation requiring "3T" cannot be performed when the operation time is fixed at "2T". Therefore, as shown in Table 1, when the possible operation times are "2T" and "3T", the longest time "3T" should be fixed.

As mentioned above, the longest operation time of a conventional operation device is fixed at "3T", regardless of the number of logic transitions by bits of the input signal. Therefore, when an actual operation time of an input signal is less than "3T", the operated signal must wait until the time "3T" lapses, which results in a waste of time, and an unnecessarily long operation time.

In addition, since the conventional operation device has a fixed operation time, the operation time cannot be adjusted variably, according to the applied system.

SUMMARY OF THE INVENTION

Accordingly, it is an object of the present invention to provide an operation apparatus in which an operation time is able to be adjusted in accordance with the number of logic transitions by bits of an input signal.

It is another object of the present invention to provide a means for adjusting an operation time of an operation apparatus in accordance with the number of logic transitions detected by bits of an input signal.

To achieve the above object, there is provided an operation apparatus which includes an operation unit for latching and operating an input signal in accordance with a latch signal, and then outputting the operated signal in accordance with an output enable signal, a controller for controlling a time gap between outputting of a latch signal in accordance with first and second levels of a time control signal and outputting of an output enable signal and for controlling an operation of the operation unit, a logic transition detector for receiving a signal inputted to the operation unit and detecting the number of a logic transition by bit of an input signal, and a signal generator for outputting a first and a second levels of a time control signal in accordance with the value of a logic transition detecting signal and a transition bit detecting signal.

In the controller, the logic transition detector, the signal generator, and a clock signal are used as a standard signal. In addition, a first latch signal of the controller is applied to the logic transition detector, and used when detecting a logic transition.

Besides, an operation control method of the present invention includes a stage for detecting the number of a logic transition by bit of an input signal and outputting a logic transition detecting signal, a stage for outputting a time control signal of first and second levels in accordance with the logic transition detecting signal and a transition bit selecting signal, a stage for adjusting a time gap between a latch signal and an output enable signal in accordance with first and second levels of the time control signal, and a stage for latching and operating the input signal in accordance with the latch signal, and then outputting the operated signal in accordance with output enable signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A through 2G are timing diagrams of the operation signals in the conventional operation apparatus of FIG. 1;

FIGS. 7A through 7G are diagrams showing the operation time of the apparatus of FIG. 3.

DETAILED DESCRIPTION OF THE PREFERRED EMBODIMENTS

Figure 3:
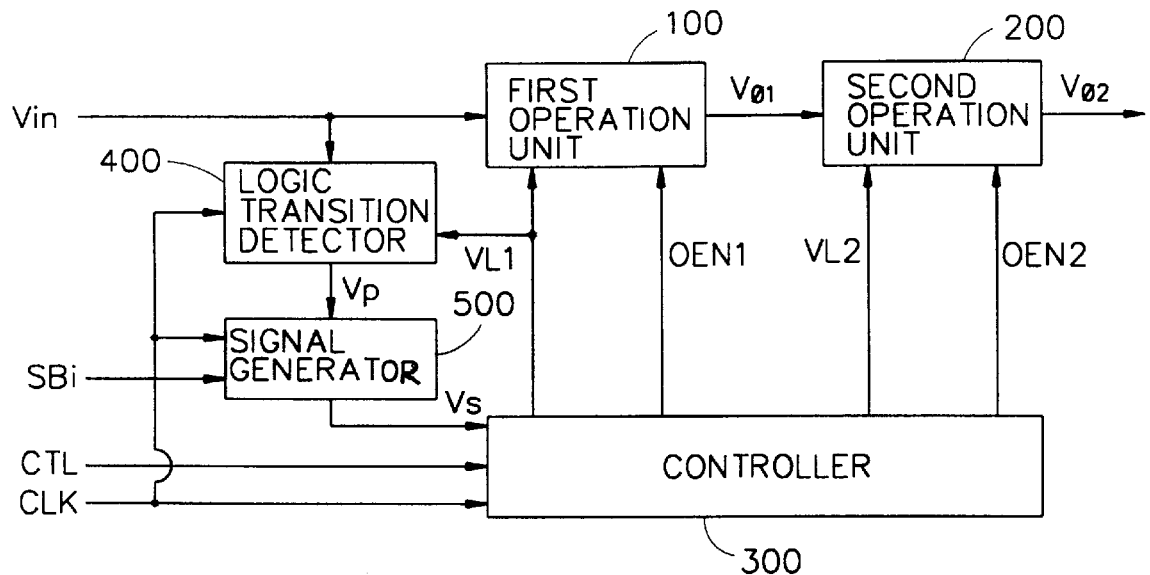
FIG. 3 is a block diagram of an operation apparatus of the present invention.

The present invention will now be described in more detail with reference to the accompanying drawings. As shown in FIG. 3, an operation apparatus in accordance with the present invention includes a logic transition detector 400 for detecting logic transitions by bits of an input signal $V_{in}$ and outputting a logic transition detection signal Vp, a signal generator 500 for receiving the logic transition detection signal Vp and outputting a time control signal $V_s$ in accordance with the value of an externally applied transition bit selecting signal $SB_i$, a controller 300 for outputting a first latch signal VL1, a second latch signal VL2, and a first output enable signal OEN1 in accordance with the value of an applied control signal CTL and the time control signal $V_s$ from the signal generator 500, a first operation unit 100 for latching and operating upon the input signal $V_{in}$ in accordance with a first latch signal VL1 outputted from the controller 300, and then outputting the operated signal $V_{o1}$ in accordance with the first output enable signal OEN1, and a second operation unit 200 for latching and operating upon the output signal $V_{01}$ of the first operation unit 100 in accordance with the second latch signal VL2 from the controller 300 and then outputting the operated output signal $V_{o2}$ in accordance with OEN2.

Here, a clock signal CLK is applied to the controller 300, the logic transition detector 400, and the signal generator 500, and used as a standard signal. In addition, the first latch signal VL1 from the controller 300 is applied to the logic transition detector 400, and used when detecting a logic state transition.

Figure 4A:
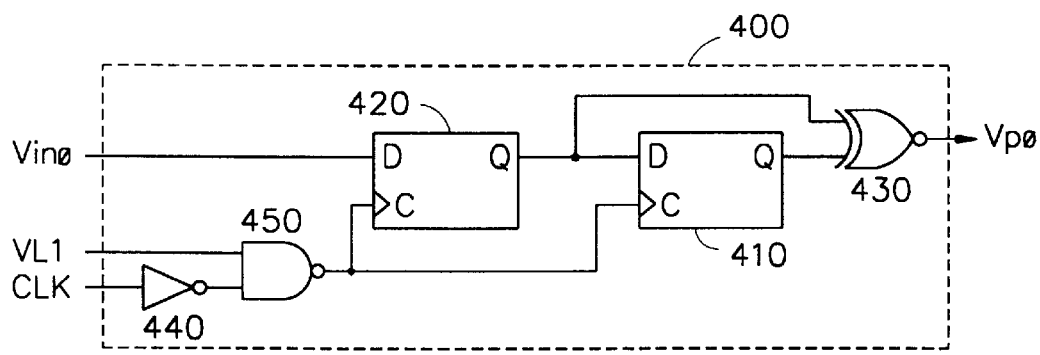
FIG. 4A is a circuit diagram illustrating an embodiment of a logic transition detector of FIG. 3.

As shown in FIG. 4A, a logic transition detector 400 of the present invention includes a first flip-flop 410 as a first storing unit for storing a previous value of the input signal $V_{in}$, a second flip-flop as a second storing unit 420 for storing a present value of the input signal $V_{in}$, and an exclusive OR gate 430 as a comparing unit for comparing the previous and present values of the input signal $V_{in}$. In addition, the clock signal CLK inverted by an inverter 440 is ANDed with the first latch signal VL1 by an AND gate 450, and the output signal of the AND gate 450 is applied to the clock "C" input terminals of the first and second flip-flops 410,420.

Figure 4B:
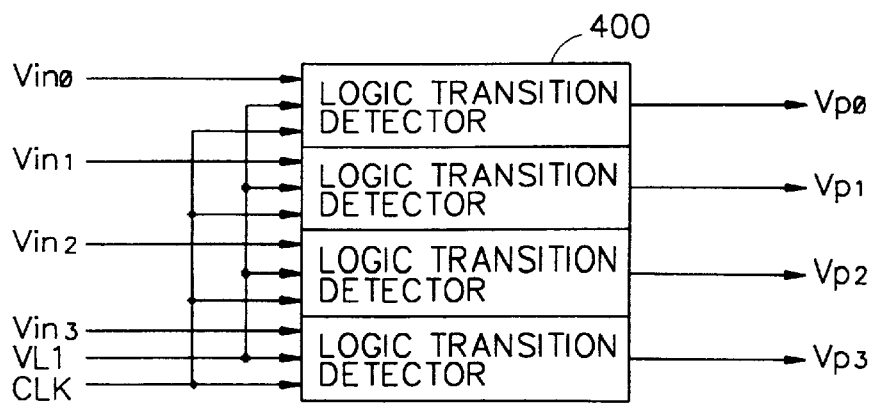
FIG. 4B is a block diagram illustrating a logic transition detector when an input signal is four bits.

FIG. 4B illustrates an example of a four-bit wide logic transition detector for detecting logic state transitions of an input signal of four bits $V_{ino}$–$V_{in3}$, and includes four of the logic transition detector circuits 400 of FIG. 4A in parallel.

Figures 5, 6:
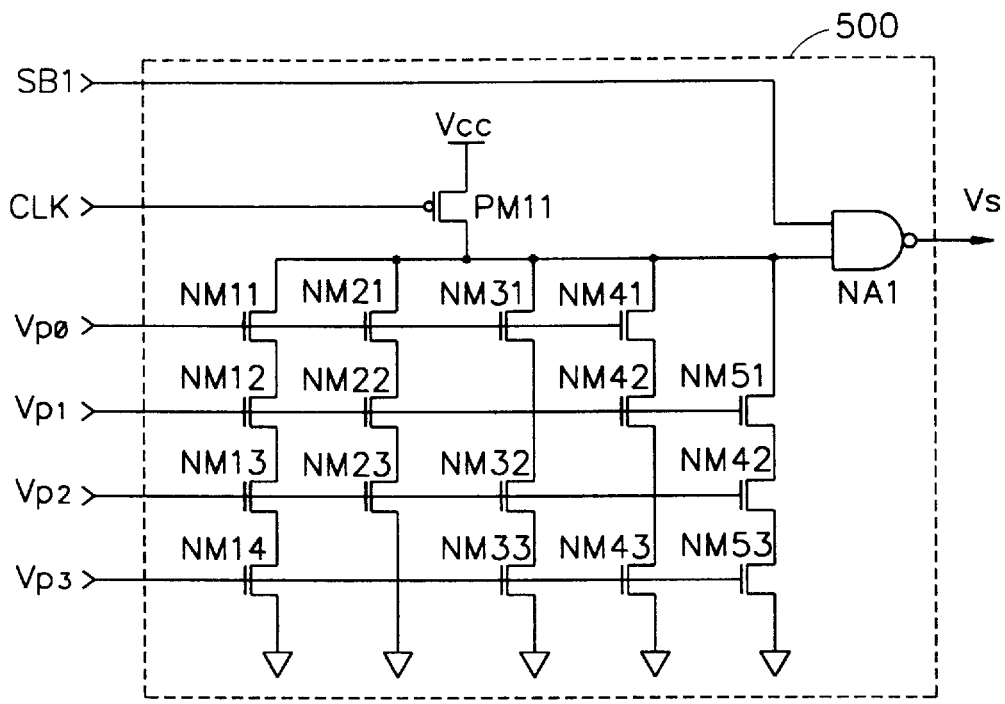
FIG. 5 is a circuit diagram illustrating an embodiment of a signal generator of FIG. 3.
FIG. 6 is a table showing example of logic transitions by bits of an input signal.

Figure. 5 illustrates an embodiment of a signal generator 500 of the present invention when the inputted logic transition detection signal VP is four bits $V_{p0}$–$V_{p3}$. The signal generator 500 includes a PMOS transistor PM11, the source of which is applied with a supply voltage $V_{cc}$ and the gate of which is applied with the clock signal CLK, series NMOS transistors $NM_{11}$–$NM_{14}$, $NM_{21}$–$NM_{23}$, $NM_{31}$–$NM_{33}$, $NM_{41}$–$NM_{43}$, and $NM_{51}$–$NM_{53}$ which are respectively connected in parallel between the drain of the PMOS transistor PM11 and ground, and a NAND gate NA1 for NANDing the signal outputted from the drain of the PMOS transistor PM11 with the transition bit selecting signal $SB_i$. Here, a first-bit signal $V_{p0}$ of the four bit-wide logic transition detection signal $V_p$ is applied to the gates of the NMOS transistors $NM_{11}$, $NM_{21}$, $NM_{31}$, and $NM_{41}$, respectively, and a second-bit signal $V_{p1}$ of the logic transition detection signal VP is applied to the gates of NMOS transistors $NM_{12}$, $NM_{22}$, $NM_{42}$, and $NM_{51}$, respectively, and a third-bit signal $V_{p2}$ of the logic transition detecting signal $V_p$ is applied to the gates of NMOS transistors $NM_{13}$, $NM_{23}$, $NM_{32}$, and $NM_{52}$, respectively, and a fourth-bit $V_{p3}$ of the transition detection signal $V_p$ is applied to the gates of the NMOS transistors $NM_{14}$, $NM_{33}$, $NM_{43}$, and $NM_{53}$, respectively.

In addition, a signal generator 500 of the present invention, although not illustrated here, could include a plurality of AND gates for receiving the output signal $V_p$ of a logic transition detector 400, and a plurality of OR gates for receiving the output signal $V_p$ and the transition bit selecting signal $SB_i$.

The operation and effect of the operation apparatus of the present invention will now be described in detail.

Figure 1:
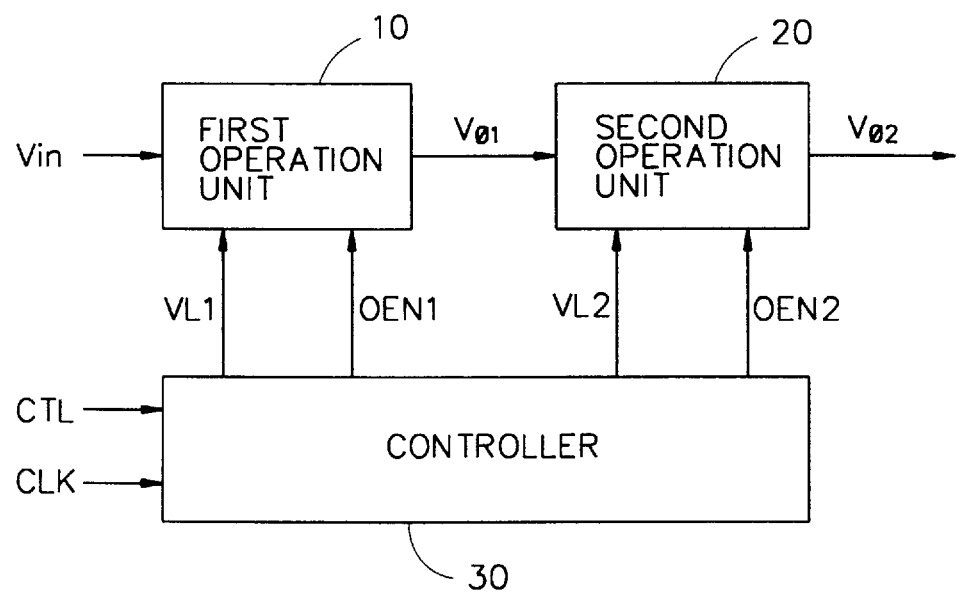
FIG. 1 is a block diagram of a conventional operation device.

Description of the function of the first operation unit 100, second operation unit 200, and controller 300 will be omitted, since their function is similar to that in the conventional arrangement of FIG. 1.

First, an input signal $V_{in}$ applied to a first operation unit 100 and an externally inputted clock signal CLK are respectively inputted to a logic transition detector 400. The logic transition detector 400 receives the above-mentioned input and clock signals, detects a logic transition by each bit of the input signal $V_{in}$, and outputs the logic transition detection signal $V_p$ to the signal generator 500.

That is, the logic transition detector 400 compares each bit of the input signal $V_{in}$ with its corresponding bit in the previous input signal, detects the occurrence of a logic state transition, and outputs a logic transition detection signal $V_p$, depending on the consequence of the detection. Here, the logic transition detection signal $V_p$ is outputted in the same number of bits as the bits of the input signal $V_{in}$, and when a logic transition appears in a bit of an input signal $V_{in}$, a corresponding bit of the logic transition detection signal $V_p$ becomes high level. When no logic transition occurs in a bit of the input signal $V_{in}$, a corresponding bit of the logic transition detection signal $V_p$ becomes low level. For example, when the input signal $V_{in}$ is four bits $V_{in0}$–$V_{in3}$ wide, the corresponding logic transition detection signal $V_p$ becomes four bits $V_{p0}$–$V_{p3}$ wide.

To describe in more detail the operation of the logic transition detector 400, an example of a bit of the input signal $V_{in}$ will be followed with reference to the accompanying drawing of FIG. 4A.

As shown in FIG. 4A, the input signal $V_{in0}$ is applied to input terminal D of the second flip-flop 420. The output signal of the AND gate 450 is applied to the clock input terminal C of the second flip-flop 420. Therefore, in the second flip-flop 420, when the output signal of the AND gate 450 applied to an input terminal C becomes high level, the input signal $V_{in0}$ applied to the input terminal D is outputted through output terminal Q. The signal outputted through the output terminal Q of the second flip-flop 420 is applied to the input terminal D of the first flip-flop 410, and also to one input terminal of the exclusive OR gate 430. The output signal of the AND gate 450 is applied to the clock input terminal C of the first flip-flop 410. Also in the first flip-flop 410, when the output signal of the AND gate 450 applied to the input terminal C thereof becomes high level, a signal applied to the input signal D thereof is outputted through an output terminal Q thereof.

Next, the signal outputted through the output terminal Q of a first flip-flop 410 is applied to the other input terminal of an exclusive OR gate 430. Therefore, the exclusive OR gate 430 exclusively ORs the output signals of the first and second flip-flops 410 and 420, to output the logic transition detection signal $V_p$.

For example, when a bit A of an input signal is outputted through the second flip-flop 420, the bit A of the input signal is applied to the D input terminal of the first flip-flop 410 and to one input of the exclusive OR gate 430. Continuously, while a corresponding succeeding present bit of B of the input signal is outputted through a second flip-flop 420, the previous bit A of the input signal is outputted through the first flip-flop 410 and applied to the other input of the exclusive OR gate 430. Therefore, the exclusive OR gate 430 exclusively ORs the previous bit A of the input signal and the present bit B of the input signal. When a logic transition occurs in the input signal, that is, when the bit A is zero (0) and the bit B is one (1), or when the bit A is one (1) and the bit B is zero (0), the exclusive OR gate 430 outputs a high level as the logic transition detection signal $V_p$, indicating that a logic transition occurs in the input signal. But, when no logic transition occurs in the input signal, in other words, when bits A and B are both zero, or both one, the exclusive OR gate 430 outputs a low level as the logic transition detection signal $V_p$, indicating that a logic transition has not occurred in the input signal.

Next, the logic transition detection signal $V_p$ outputted from a logic transition detector 400 is applied to a signal generator 500. The signal generator 500 receives the logic transition detection signal $V_p$, and outputs the time control signal $V_s$ in accordance with the value of the externally applied transition bit selecting signal $SB_i$. That is, when the number of bit-wide logic transitions detected in a logic transition detector 400 exceeds a predetermined number set by the transition bit selecting signal $SB_i$, a high level of the time control signal $V_s$ is outputted. When the number of logic transitions is below the predetermined number set by the transition bit selecting signal $SB_i$, a low level of the time control signal $V_s$ is outputted. For example, as shown in FIG. 5, when the input signal $V_p$ is four bits $V_{p0}$–$V_{p3}$ wide, and when the number of logic transition is three (3) or four (4), a high level of the time control signal $V_s$ is outputted, and when the number of logic transitions is zero, one, or two, a low level of the time control signal $V_s$ is outputted.

Here, the number of logic transition groups is proportional to the number bits of the transition bit selecting signal $SB_i$. For example, when the transition bit selecting signal $SB_i$ is one bit wide, the number of groups of logic transitions is divided into two, and when the transition bit selecting signal $SB_i$ is two bits wide, the number of groups of logic transitions is divided into four.

FIG. 6 is a table showing the output signal $V_{p0}$–$V_{p3}$ of the logic transition detector 400, when the number of logic transitions is divided into two groups, that is, a first group including zero (0), one (1), and two (2) transitions, or three (3) transitions and another group for four transitions (4).

Therein, a signal generator 500 which has the construction as in FIG. 5 generates a corresponding time control signal $V_s$ in accordance with the output signal $V_p$ of the logic transition detector 400. In other words, when the output signal $V_{p0}$–$V_{p3}$ has a value according to the table of FIG. 6, since at least one of the five paths which are connected between the drain and ground of the PMOS transistor PM11 is turned on, an electrical potential of the PMOS transistor PM11 becomes low level. After this low level value and the high level of the transition bit selecting signal $SB_i$ are operated by the NAND gate NA1, a high level time control signal $V_s$ is outputted. But, when the value of the logic transition detection signal is not the same as that in the table of FIG. 6, in other words, if the number of high level values is below three (3), the five paths are all shut off. Thus, when the PMOS transistor PM11 is turned on by the clock signal CLK, the supply voltage $V_{cc}$ applied to the PMOS transistor PM11 is transmitted to the drain. The supply voltage $V_{cc}$ is operated in accordance with a high level of the transition bit selecting signal $SB_i$ in the NAND gate NA1, and a low level time control signal $V_s$ is outputted.

Meanwhile, a controller 300, similar to a conventional controller 30, is enabled in accordance with the control signal CTL, counts the clock CLK, and generates the first and second latch signals VL1 and VL2, and first and second output enable signals OEN1 and OEN2. However, the time gap between the first latch signal VL1 and the first output enable signal OEN1 is determined by the time control signal $V_s$ outputted from a signal generator 500. That is, when the output signal $V_s$ of the signal generator 500 is low level, the controller 300 sets a time gap of '2T' between the first latch signal VL1 and the first output enable signal OEN1, and when the output signal of the signal generator 500 is high level, the controller 300 sets a time gap of '3T' between the first latch signal VL1 and the first output enable signal OEN1.

TABLE 2

| number of input bit transition | actual operating time | operation time of the present invention |
|---|---|---|
| 0, 1, 2 | 2T | 2T |
| 3, 4 | 3T | 3T |

In the meantime, the set first latch signal VL1 and the first output enable signal OEN1 are outputted to a first operation unit 100, and a second latch signal VL2 and a second output enable signal OEN2 are outputted to a second operation unit 200. In addition, the first latch signal VL1 is outputted to the AND gate 450 of a logic transition detector 400 to be ANDed with the clock signal CLK, and used as a control signal for determining the operation timing of the flip-flops 410 and 420.

Therefore, a first operation unit 100 operates upon the input signal $V_{in}$ latched in accordance with the first latch signal VL1 from a controller 300, and outputs the operated signal $V_{o1}$ in accordance with the first output enable signal OEN1. Meanwhile, the second operation unit 200 operates upon the operated output signal $V_{o1}$ from the first operation unit 100, and outputs an output signal $V_{o2}$ in accordance with the second output enable signal OEN2 from the controller 300.

In other words, operating of the first operation unit 100 doesn't waste unnecessary time, and transmits the output signal $V_{o1}$ to a second operation unit 200, due to the latch and enable signals VLs and OENs being outputted from a controller 300 with a variable time difference therebetween. And, the operation of a second operation unit 200 is the same as that of a first operation unit 100.

The operation of these signals will be described in detail with reference to FIGS. 7A through 7H.

When the input signal $V_{in}$ of FIG. 7D is applied thereto, a logic transition detector 400 indicates that the number of a logic transition is two (2), by outputting the logic transition detection signal $V_p$ of "1111", when the input signal $V_{in}$ transits from "0000" to "1111". Next, a signal generator 500, to which the logic transition detection signal $V_p$ is inputted, outputs the low level time control signal $V_s$ of FIG. 7H, since the number of logic transitions is below three (3). Therefore, a controller 300 sets a time gap of 2T between the first latch signal VL1 and the first output enable signal OEN1, as shown in FIGS. 7B and 7C.

In addition, when the input signal $V_{in}$ transits from "1100" to "0011", a logic transition detector 400 outputs the logic transition detection signal $V_p$ of "1111", as shown in FIG. 7G, which indicates that the number of logic transitions is four (4). Since the number of logic transitions exceeds three (3), as shown in FIG. 7H, a signal generator 500 outputs the high level time control signal $V_s$ to a controller 300. Therefore, the controller 300 sets a 3T time gap between the first latch signal VL1 and the first output enable signal OEN1, as shown in FIGS. 7B and 7C. Accordingly, a first operation 100 outputs the output signal $V_{o1}$ of FIG. 7E to a second operation unit 200, when the first enable signal OEN1 is inputted thereto. Here, FIG. 7F illustrates the second latch signal VL2 which is enabled at the same time as the first output enable signal OEN1.

As described in detail above, whereas in the conventional operation system, an operation time is fixed at the highest value among the possibly required actual operation times, the present invention can advantageously reduce the average operation time, and has the effect of improving an operation efficiency of the system since the operation time is adjusted in accordance with the number of input bit transitions.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An operation apparatus, comprising;
   operation means for logically processing an input signal in accordance with a latch signal, wherein the operation means transmits an output signal in accordance with an output enable signal;
   a controller that outputs the latch signal and the output enable signal, and wherein the controller controls an operation timing of the operation means in accordance with first and second levels of a time control signal;
   logic transition detecting means for receiving the input signal and the latch signal inputted to the operation means and detecting a number of logic transitions of the input signal in accordance with the latch signal; and
   signal generating means for outputting the time control signal having such first and second levels in accordance with a logic transition detection signal outputted from the logic transition detecting means and a transition bit selecting signal.

2. The operation apparatus of claim 1, wherein said operation means includes a plurality of operation means.

3. The operation apparatus of claim 1, wherein the operation means latches and operates the input signal.

4. The operation apparatus of claim 1, wherein the number of logic transitions is a number of binary bit logic transitions.

5. The operation apparatus of claim 1, wherein the transition bit selecting signal is an externally applied signal having a prescribed value.

6. The operation apparatus of claim 1, wherein a clock signal is input to the logic transition detecting means, the signal generating means and the controller.

7. The operation apparatus of claim 1, wherein said signal generating means includes a PMOS transistor, wherein the PMOS transistor receives a supply voltage at a first terminal and receives a clock signal at a control terminal;
   a plurality of NMOS transistors for forming a plurality of parallel paths between a second terminal of the PMOS transistor and ground; and
   a NAND gate for NANDing the transition bit selecting signal with a signal outputted from the second terminal of the PMOS transistor.

8. The operation apparatus of claim 1, wherein said logic transition detecting means has a first storing means for storing a previous value of the input signal, a second storing means for storing a present value of the input signal, and a comparing means for comparing the previous value and the present value.

9. The operation apparatus of claim 8, wherein said logic transition detecting means includes a first flip-flop as the first storing means, a second flip-flop as the second storing means, and an exclusive OR gate as the comparing means.

10. An operation apparatus, comprising;
    an operation circuit that logically processes a first signal in accordance with a latch signal, wherein the operation circuit transmits an output signal in accordance with a second signal;
    a controller that outputs the latch signal and the second signal, wherein the controller controls an operation timing of the operation circuit in accordance with first and second levels of a time control signal;
    a logic transition detecting circuit that receives the first signal and the latch signal inputted to the operation circuit and detects a number of logic transitions of the first signal in accordance with the latch signal; and
    a signal generating circuit that outputs the time control signal having the first and second levels in accordance with a logic transition detection signal outputted from the logic transition detecting circuit and a transition bit selecting signal.

11. The operation apparatus of claim 10, wherein the first signal is an input signal and the second signal is an output enable signal.

12. An operation control method, comprising;
    detecting a number of logic transitions by bits of an input signal to output a logic transition detection signal;
    outputting a time control signal having first and second levels in accordance with the logic transition detection signal and a transition bit selecting signal;
    variably adjusting a time period between a latch signal and an output enable signal in accordance with the first and second levels of the time control signal; and
    logically processing the input signal in accordance with the latch signal, and transmitting an output signal in accordance with the output enable signal.

13. The method of claim 12, wherein said logic transition detection signal has a high level with respect to corresponding bits of the input signal when a logic transition occurs in each of the corresponding bits of the input signal, and has a low level with respect to said each of the corresponding bits when no logic transition occurs.

14. The method of claim 13, wherein said time control signal has a high level value when, in the logic transition detection signal, the number of bits having a high level exceeds a set value and has a low level value when the number of bits having a high level is below the set value.

15. The method of claim 13, wherein the number of groups of possible logic transitions in the input signal is proportional to a number of bits of the transition bit selecting signal.

16. The method of claim 15, wherein the variably adjusting step comprises setting the time period to a first number of clock cycles when the time control signal has the first level and setting the time period to a second number of clock cycles when the time control signal has the second level, wherein the first number is smaller than the second number.

* * * * *